(12) United States Patent
Stalemark

(10) Patent No.: US 9,138,812 B2
(45) Date of Patent: Sep. 22, 2015

(54) DECK MOUNTING COMPONENTS FOR ATTACHMENT OF POSTS AND THE LIKE

(76) Inventor: Eric Stalemark, Alpharetta, GA (US)

( * ) Notice: Subject to any disclaimer, the term of this patent is extended or adjusted under 35 U.S.C. 154(b) by 0 days.

(21) Appl. No.: 13/572,290

(22) Filed: Aug. 10, 2012

(65) Prior Publication Data

US 2013/0048825 A1    Feb. 28, 2013

Related U.S. Application Data

(60) Provisional application No. 61/528,248, filed on Aug. 28, 2011.

(51) Int. Cl.
| | | |
|---|---|---|
| *A47G 25/12* | (2006.01) |
| *B23B 47/28* | (2006.01) |
| *E04H 12/22* | (2006.01) |
| *E04H 17/22* | (2006.01) |

(52) U.S. Cl.
CPC ............ *B23B 47/28* (2013.01); *E04H 12/2261* (2013.01); *B23B 2247/10* (2013.01); *E04H 17/22* (2013.01); *Y10T 29/49947* (2015.01); *Y10T 408/98* (2015.01)

(58) Field of Classification Search
USPC ............ 248/534, 511, 519, 538, 523, 346.01, 248/346.03, 188.1, 231.31, 903; 408/115 R, 408/241 G; 52/296, 297, 298, 127.2, 155, 52/169.9, 165, 170, 170.2, 736.1, 736.4, 52/737.5, 738.1; 29/525.01
See application file for complete search history.

(56) References Cited

U.S. PATENT DOCUMENTS

| | | | | |
|---|---|---|---|---|
| 1,705,742 A | * | 3/1929 | Werner ............................ | 52/149 |
| 1,808,633 A | * | 6/1931 | Carver ............................ | 52/158 |
| 2,826,281 A | * | 3/1958 | Johnson .......................... | 52/158 |
| 3,563,502 A | * | 2/1971 | Dayson ............................ | 52/98 |
| 3,591,113 A | * | 7/1971 | Foster, Jr. ...................... | 248/519 |
| 3,809,346 A | * | 5/1974 | Jackson .......................... | 248/530 |
| 4,048,776 A | * | 9/1977 | Sato ................................ | 52/297 |
| 4,381,160 A | | 4/1983 | Grimm et al. | |
| 4,402,166 A | * | 9/1983 | Wortham, Jr. ................... | 52/155 |
| 4,793,111 A | * | 12/1988 | Shewchuk ....................... | 52/298 |
| 5,029,820 A | * | 7/1991 | Katz ................................ | 256/59 |
| 5,039,256 A | * | 8/1991 | Gagliano ....................... | 405/244 |
| 5,104,074 A | * | 4/1992 | Malloy .......................... | 248/156 |
| 5,143,472 A | * | 9/1992 | Reed et al. .................... | 403/230 |
| 5,243,795 A | * | 9/1993 | Roberts .......................... | 52/158 |
| 5,375,384 A | | 12/1994 | Wolfson | |
| 5,395,184 A | * | 3/1995 | Gagliano ....................... | 405/229 |
| 5,499,885 A | * | 3/1996 | Chapman ....................... | 403/380 |
| 5,568,909 A | * | 10/1996 | Timko ............................ | 248/519 |
| 5,632,464 A | * | 5/1997 | Aberle ............................ | 248/530 |

(Continued)

*Primary Examiner* — Monica Millner
(74) *Attorney, Agent, or Firm* — Baker Hotetler LLP

(57) ABSTRACT

A device for anchoring a post to a supporting surface is disclosed. In one embodiment, the device comprises a base member and post mounting plate, the post mounting plate comprising a post-facing seat, the base member and post mounting plate comprising a plurality of first openings, each such first opening for accepting and accommodating a fastener for attaching the device to a post, and a plurality of second openings, each such second opening for accepting and accommodating a fastener for attaching the device to a supporting surface. Each first opening is disposed to accept a fastener, such as a screw, at an upwardly inclined angle and, further, at a laterally displaced offset angle. The device orients and positions a plurality of fasteners within the post in a configuration wherein the fasteners are disposed angularly about, and offset from, a central, vertical axis in a preferably non-intersecting arrangement.

21 Claims, 9 Drawing Sheets

(56) References Cited

U.S. PATENT DOCUMENTS

| | | | | |
|---|---|---|---|---|
| 5,873,679 | A * | 2/1999 | Cusimano | 405/231 |
| 5,930,966 | A * | 8/1999 | Wood et al. | 52/364 |
| 6,213,452 | B1 * | 4/2001 | Pettit et al. | 256/59 |
| 6,324,800 | B1 * | 12/2001 | Valentz et al. | 52/298 |
| 6,336,620 | B1 * | 1/2002 | Belli | 248/519 |
| 6,446,403 | B2 | 9/2002 | Hoffman et al. | |
| 6,513,290 | B2 | 2/2003 | Leek | |
| 6,578,333 | B1 * | 6/2003 | Gagliano | 52/295 |
| 6,672,017 | B2 * | 1/2004 | Larson | 52/170 |
| 6,718,710 | B2 * | 4/2004 | Platt | 52/296 |
| 6,857,808 | B1 * | 2/2005 | Sugimoto et al. | 403/41 |
| 6,868,641 | B2 * | 3/2005 | Conner et al. | 52/98 |
| 6,871,455 | B1 * | 3/2005 | Cockman et al. | 52/165 |
| 6,910,832 | B2 * | 6/2005 | Gagliano et al. | 405/231 |
| 6,948,283 | B2 * | 9/2005 | Burkart et al. | 52/155 |
| 6,988,700 | B2 * | 1/2006 | Cote | 248/519 |
| 7,076,925 | B2 * | 7/2006 | Gagliano | 52/155 |
| D547,463 | S | 7/2007 | Gross et al. | |
| 7,326,003 | B2 * | 2/2008 | Gagliano | 405/229 |
| 7,533,506 | B2 * | 5/2009 | Platt | 52/296 |
| D599,915 | S | 9/2009 | Godwin | |
| 7,597,513 | B2 | 10/2009 | Chiang | |
| 7,604,209 | B2 * | 10/2009 | Warton et al. | 248/200 |
| 7,722,014 | B2 | 5/2010 | Godwin | |
| 7,828,261 | B2 * | 11/2010 | Greer | 248/511 |
| 2003/0066251 | A1 * | 4/2003 | Cusimano | 52/169.9 |
| 2004/0025460 | A1 * | 2/2004 | Terrels | 52/298 |
| 2005/0278934 | A1 | 12/2005 | Orchard | |
| 2007/0158526 | A1 * | 7/2007 | Platt | 248/519 |
| 2008/0075546 | A1 | 3/2008 | Lin | |
| 2011/0214363 | A1 * | 9/2011 | Day et al. | 52/169.5 |

* cited by examiner

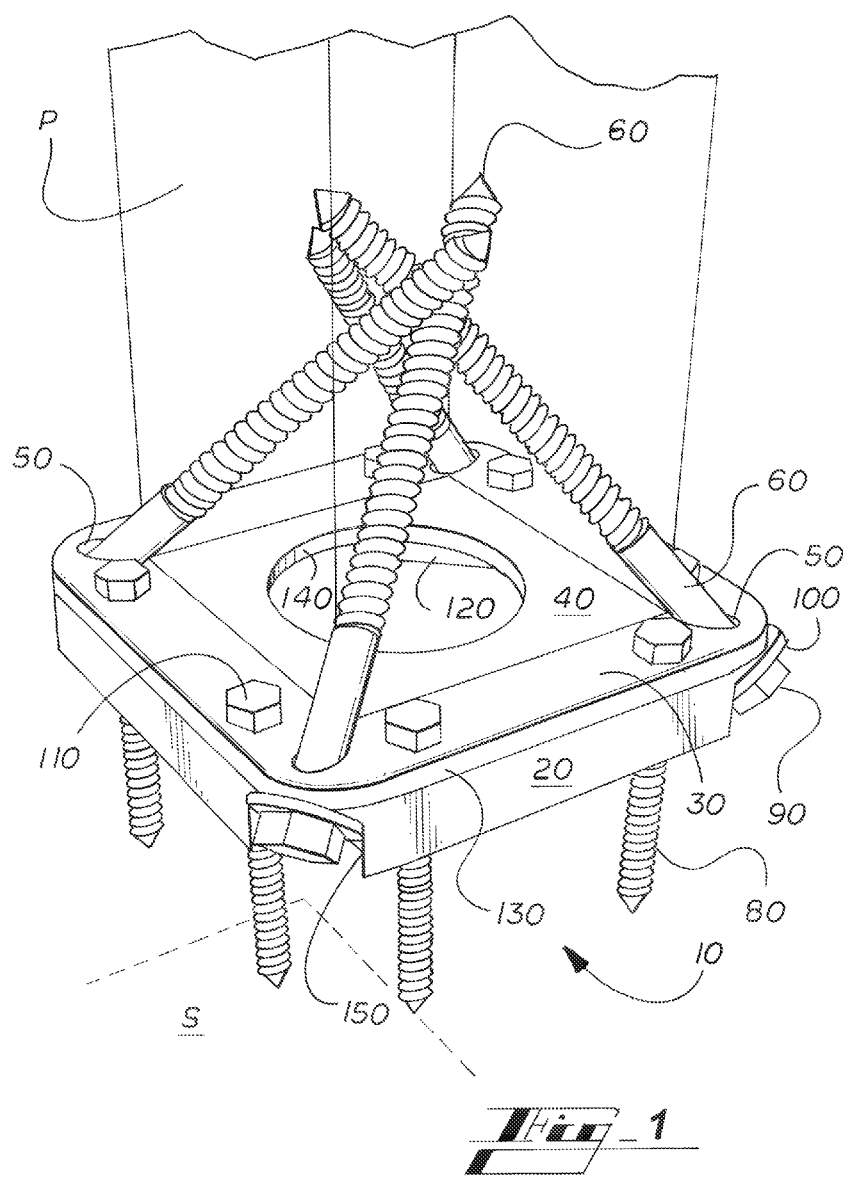

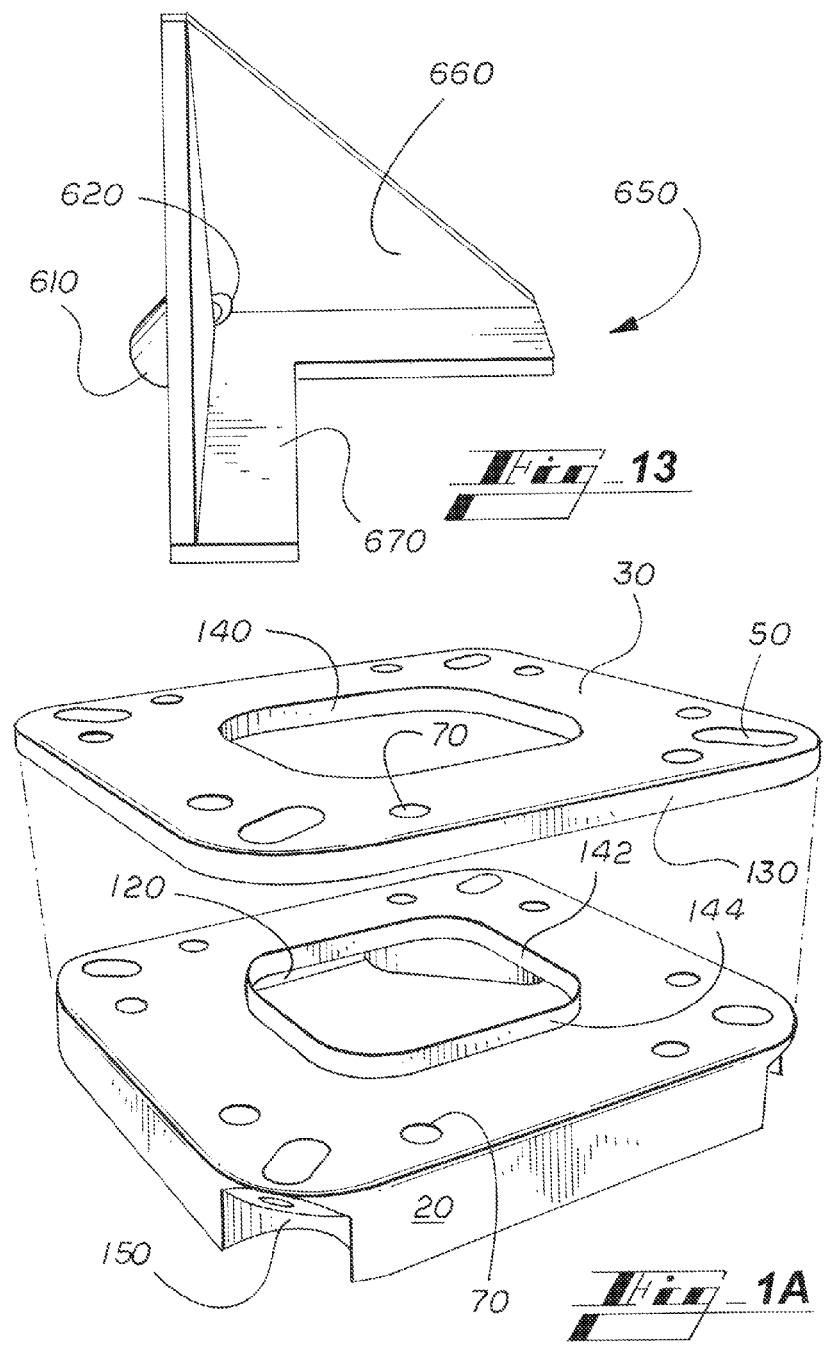

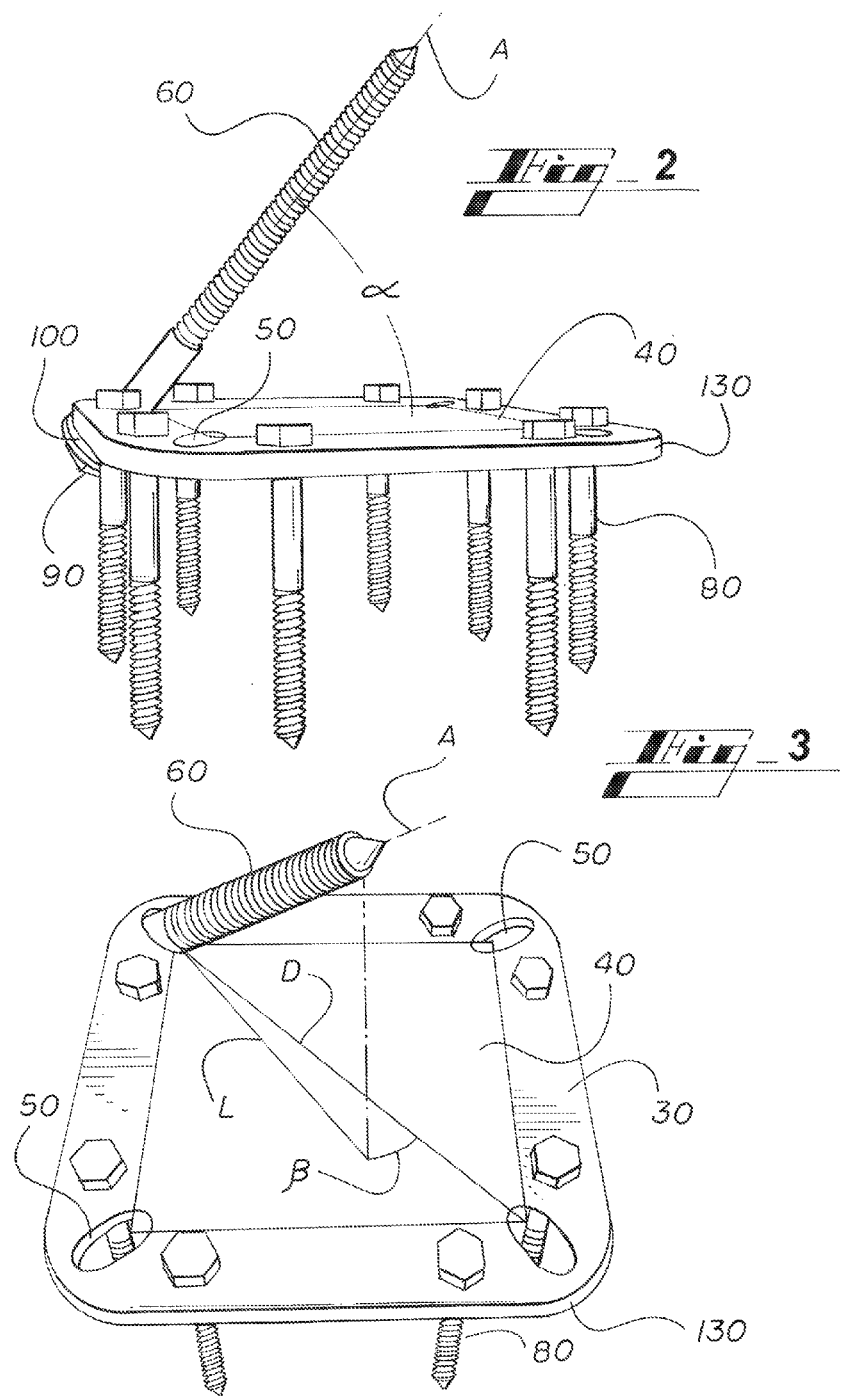

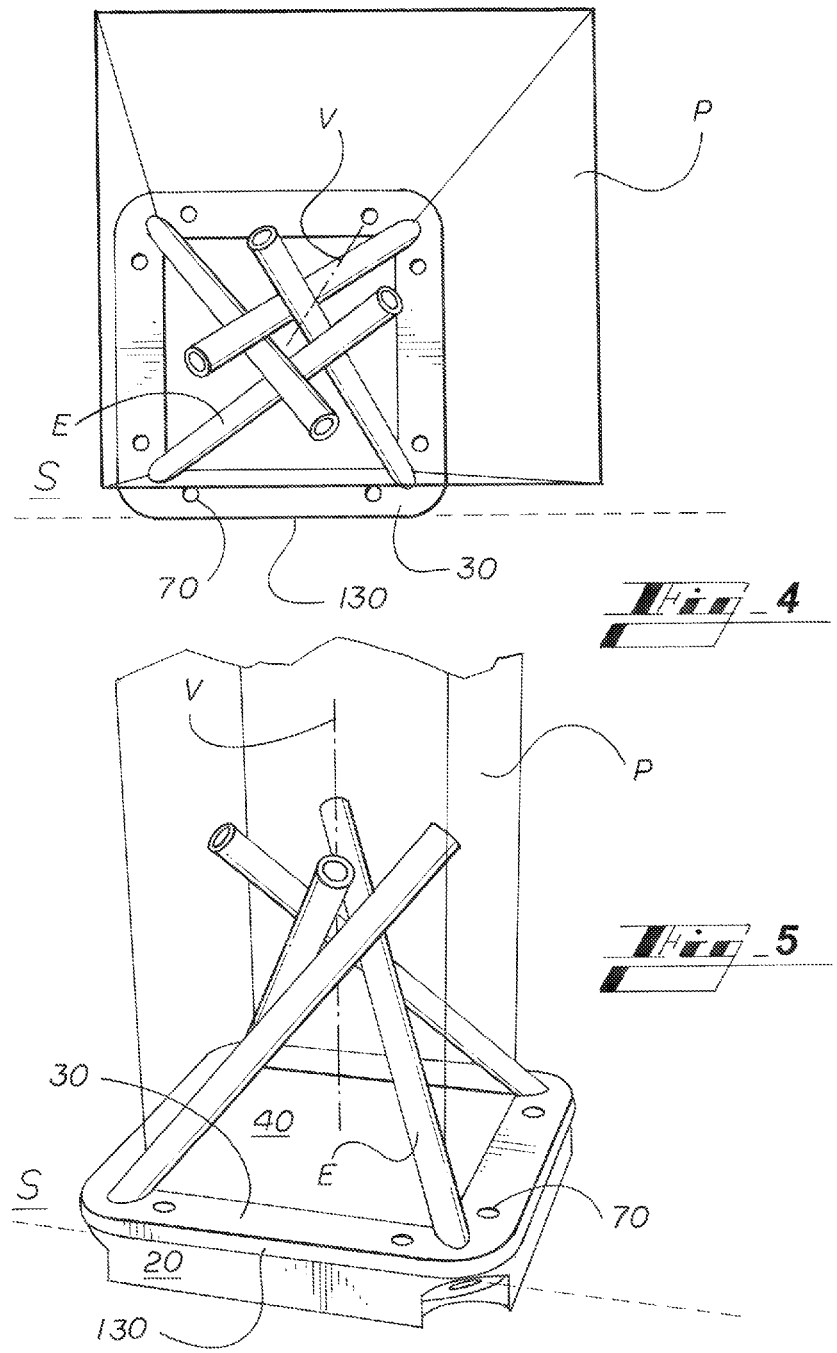

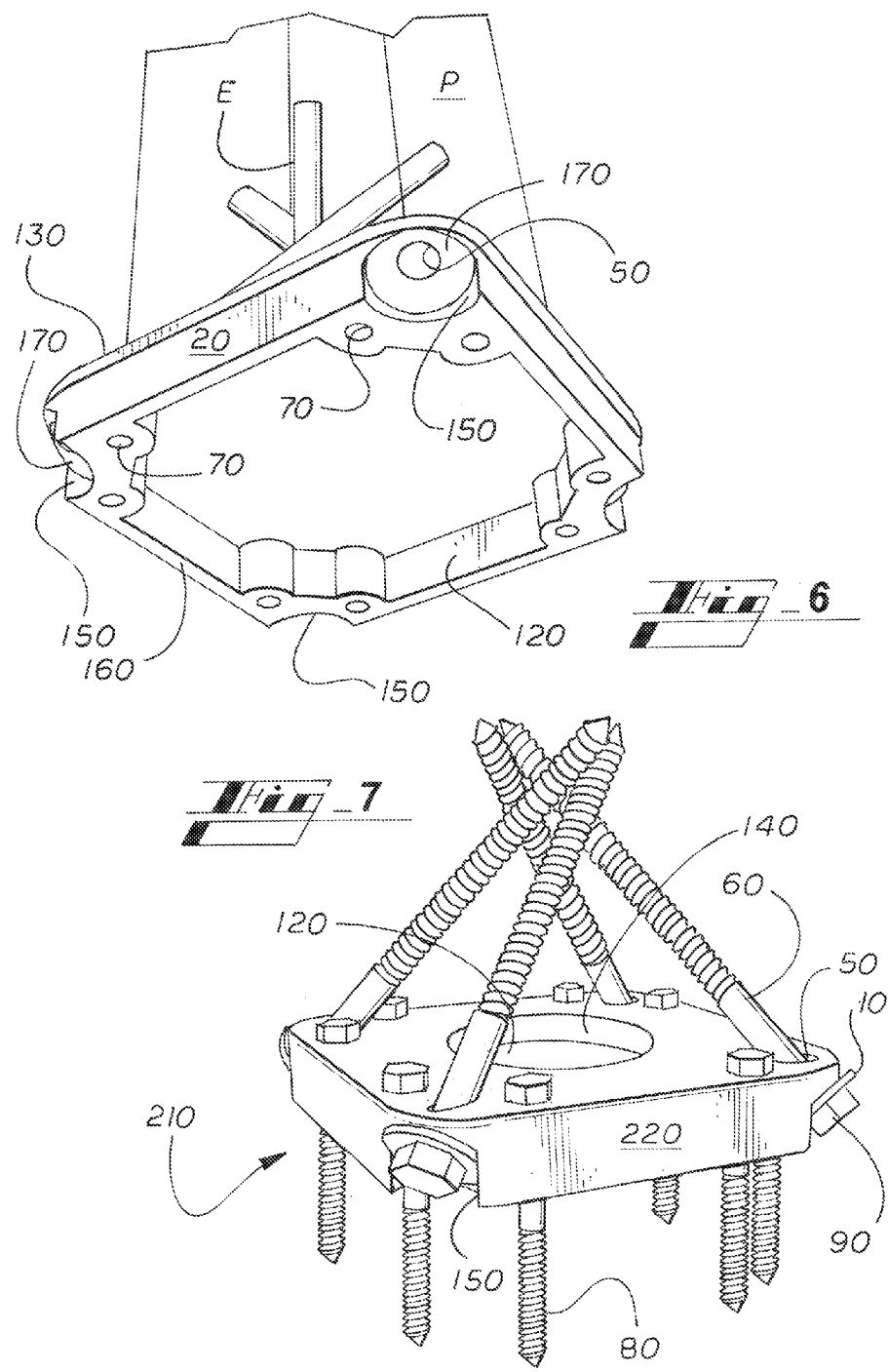

DECK MOUNTING COMPONENTS FOR ATTACHMENT OF POSTS AND THE LIKE

CROSS-REFERENCE TO RELATED APPLICATIONS

This United States non-provisional patent application claims priority to U.S. provisional patent application Ser. No. 61/528,248 filed on Aug. 28, 2011, the disclosure of which is incorporated by reference herein as though set forth in its entirety.

TECHNICAL FIELD

The subject matter of the present invention relates, generally, to fastening and mounting systems used for securing posts and the like to supporting surfaces and, more particularly, relates to devices for fastening, anchoring, and mounting posts made of wood or other materials, such as are used in deck, fence, balcony, and railing applications, to supporting surfaces of any appropriate material.

BACKGROUND

In deck, fence, balcony, and railing applications, vertical posts are affixed to an engineered or otherwise stabilized, horizontal surface. Such vertical posts, in the case of deck, balcony, and railing applications, are designed to carry, support, and/or affix safety elements such as hand rails, spindles, balusters, newel posts, and the like, along with decorative items, such as finials. In fence applications, vertical posts typically carry and/or support gates and transverse support members, to which are attached fence boards, and/or other appropriate fence constructs.

In deck, balcony, and railing applications, it is readily apparent that such vertical posts must be stiff, strong, and stable, in order to support and protect persons relying upon the posts and their associated structures for personal safety and protection. In fence applications, it is equally readily apparent that such vertical posts must be stiff, strong, and stable, in order to support attached structures, to prevent impact penetration, and the like.

In order to prevent or mitigate catastrophic failures of deck, fence, balcony, and railing structures, wherein lives may be lost, personal injuries suffered, and/or significant property damage may be caused, the mechanical, structural junction between the vertical post and the mounting surface is critical. This junction must also be stiff, strong, and stable, so that structural failure does not occur at the junction. Unfortunately, such junctions are often cited as points of catastrophic failure.

In an effort to mitigate such failures, prior art devices have endeavored to strengthen such junctions. Some representative, prior art devices make use, for example, of a base plate member, to which is affixed a tubular structure that is disposed to be captured within a bored-out, or otherwise cylindrical, region of a post. Not only may such bored-out or cylindrical region reduce the strength of the post by reducing its cross-sectional area, but the tubular member itself may not be strong enough to counteract the significant bending moments that such junctions encounter; and, ultimately, failure may result in the post material, the junction, or both.

Other representative, prior art devices make use, for example of a base plate member, through which are disposed a plurality of vertically-oriented screw fasteners. The screw fasteners penetrate the end of the post and rely upon axially constrained compressive forces to affix the post to the base plate member. Again, this type of joint often is not itself strong enough to counteract the significant bending moments that such junctions encounter; and, again, ultimately, failure may result in the post material, the junction, or both.

Therefore, what is needed, but which has not heretofore been available, is a novel device for anchoring a post to a supporting surface, wherein the device comprises a base member and a post mounting surface, the post mounting surface comprising a post-facing seat, the base member and post mounting surface comprising a plurality of first openings, each such first opening for accepting and accommodating a fastener for attaching the device to a post, and a plurality of second openings, each such second opening for accepting and accommodating a fastener for attaching the device to a supporting surface. Each first opening is disposed to accept and orient a fastener, such as a screw, at an upwardly inclined angle and, further, at a laterally displaced offset angle. Such a device would obviate or reduce the above-discussed problems and disadvantages found within the prior art. Such a novel device is, accordingly, described herein.

SUMMARY

Briefly described, in a preferred embodiment, the present invention overcomes the above-mentioned disadvantages, and meets the above-recognized need, by providing, generally, inventive devices for fastening, anchoring, and mounting posts made of wood or other materials, such as are used in deck, fence, balcony, and railing applications, to a mounting surface of any appropriate material.

More specifically, described herein are various embodiments of a device for anchoring a post to a supporting surface. In a preferred embodiment, the device comprises a base member and post mounting surface, the post mounting surface comprising a post-facing seat, the base member and post mounting surface comprising a plurality of first openings, each such first opening for accepting and accommodating a fastener for attaching the device to a post, and a plurality of second openings, each such second opening for accepting and accommodating a fastener for attaching the device to a supporting surface. Each first opening is disposed to accept and orient a fastener, such as a screw, at an upwardly inclined angle and, further, at a laterally displaced offset angle.

With this configuration, a device according to the present invention uniquely orients and positions a plurality of fasteners within the post for a significantly stiffer, stronger, and more stable connection than is known within the current state of the art. More particularly, the device orients and positions a plurality of fasteners within the post in a configuration wherein the fasteners are disposed angularly about, and offset from, a central, vertical axis in a preferably non-intersecting arrangement.

Alternative embodiments of the device of the present invention are also provided within the disclosure, and which accommodate varying or alternative methods of manufacture. In some embodiments, a device according to the present invention may include an aesthetically pleasing cover.

Further included within the disclosure of the present invention is one form of guide that may be used to open, such as by drilling, a pilot hole within a post for subsequent use and association with a fastener carried by a first opening of a device according to the present invention. Through use of such a guide, an appropriate pilot opening may be formed within a post at a preferred upwardly inclined angle and at a preferred laterally displaced offset angle in order to more easily accept a fastener in a preferred orientation. The guide may be configured to locate and fit against a corner of a post and may carry one or more feature to accept and guide a pilot hole forming tool, such as a drill bit.

Also disclosed are preferred methods of use, operation, and application of a device according to the present invention. In an exemplary method, a guide is used to open a plurality of pilot holes within a post, each pilot hole corresponding to, and for subsequent use and association with, a fastener carried by a first opening of a device according to the present invention. The post-facing seat of the device is positioned adjacent the end of the post. A fastener, such as a hex head cap screw, preferably carrying an integrally formed or separate washer, is inserted through each first opening of the device, into the pilot hole, and is subsequently screwed into the post and tightened to a preferred torque specification. The post, now carrying the entirety of the device, or in some embodiments, a portion thereof, is inverted, assembled, if necessary, with other elements of the device, and positioned upon a supporting surface. A fastener, such as a hex head cap screw, preferably carrying an integrally formed or separate washer, is inserted through each second opening of the device, and is subsequently screwed into the supporting surface and tightened to a preferred torque specification. In some embodiments, an aesthetically pleasing cover may be placed in position over the device of the present invention, the associated supporting surface, and the post-end, in order to hide the device, the mounting fasteners, and the post-end from view, and, when applicable, to provide a pleasantly contoured surface for application of stain, paint, varnish, lacquer, and/or other appropriate finish.

Thus, and advantageously over the prior art, a device according to the present invention uniquely orients and positions a plurality of fasteners within a post for a significantly stiffer, stronger, and more stable connection than is known to be possible through use of other devices in the art. Such advantages and functionality are achieved by the device of the present invention through its orientation and positioning of a plurality of fasteners within the post in a configuration wherein the fasteners are disposed angularly about, and offset from, a central, vertical axis in a preferably non-intersecting arrangement.

These and other features and advantages of devices according to the present invention will become apparent to those of ordinary skill in the art after reading the following Detailed Description of Illustrative Embodiments and Claims in view of the accompanying drawing Figures.

BRIEF DESCRIPTION OF THE DRAWINGS

Accordingly, preferred and alternative embodiments of, and methods associated with, the present invention will be understood best through consideration of, and with reference to, the following drawings Figures, viewed in conjunction with the Detailed Description of Illustrative Embodiments referring thereto, in which like reference numbers throughout the various drawing Figures designate like structure, and in which:

FIG. 1 depicts a side, perspective view of a preferred embodiment of a device for anchoring a post to a supporting surface constructed according to the present invention, looking from an outside vantage point and into an attached post, wherein can be seen the configuration of fasteners provided by the device of the present invention;

FIG. 1A depicts a side, perspective view of an alternative embodiment of the device of FIG. 1 for anchoring a post to a supporting surface constructed according to the present invention;

FIG. 2 depicts a side, perspective view of a portion of a device for anchoring a post to a supporting surface constructed according to the preferred embodiment of the present invention shown in FIG. 1, and further depicting a preferred upwardly inclined angle associated with a representative post fastener;

FIG. 3 depicts a top, perspective view of a portion of a device for anchoring a post to a supporting surface constructed according to the preferred embodiment of the present invention shown in FIG. 1, and further depicting a preferred laterally displaced offset angle associated with a representative post fastener;

FIG. 4 depicts a top, perspective view of a device for anchoring a post to a supporting surface constructed according to the preferred embodiment of the present invention shown in FIG. 1, looking downwardly and into an attached post, wherein can be seen the configuration of fasteners provided by the device of the present invention;

FIG. 5 depicts a side, perspective view of a device for anchoring a post to a supporting surface constructed according to the preferred embodiment of the present invention shown in FIG. 1, looking from an outside vantage point and into an attached post, wherein can be seen the configuration of fasteners provided by the device of the present invention, along with certain additional details of construction;

FIG. 6 depicts a side, perspective view of a device for anchoring a post to a supporting surface constructed according to the preferred embodiment of the present invention shown in FIG. 1, looking from an outside, upwardly inclined vantage point and into an attached post, wherein can be seen the configuration of fasteners provided by the device of the present invention, along with certain additional details of construction;

FIG. 7 depicts a side, perspective view of an alternative embodiment of a device for anchoring a post to a supporting surface constructed according to the present invention, wherein can be seen the configuration of fasteners provided by this alternative embodiment of the device of the present invention;

FIG. 10A depicts a side, perspective view of an alternative embodiment of the cover of FIG. 10 for use with a device for anchoring a post to a supporting surface constructed according to the present invention;

FIG. 13 depicts an inside, perspective view of an alternative embodiment of guide that may be used in association with a device for anchoring a post to a supporting surface constructed according to the present invention, the guide for purposes of opening, such as by drilling, a pilot hole within a post for subsequent use and association with a fastener carried by a first opening of a device according to the present invention.

Figure 8:
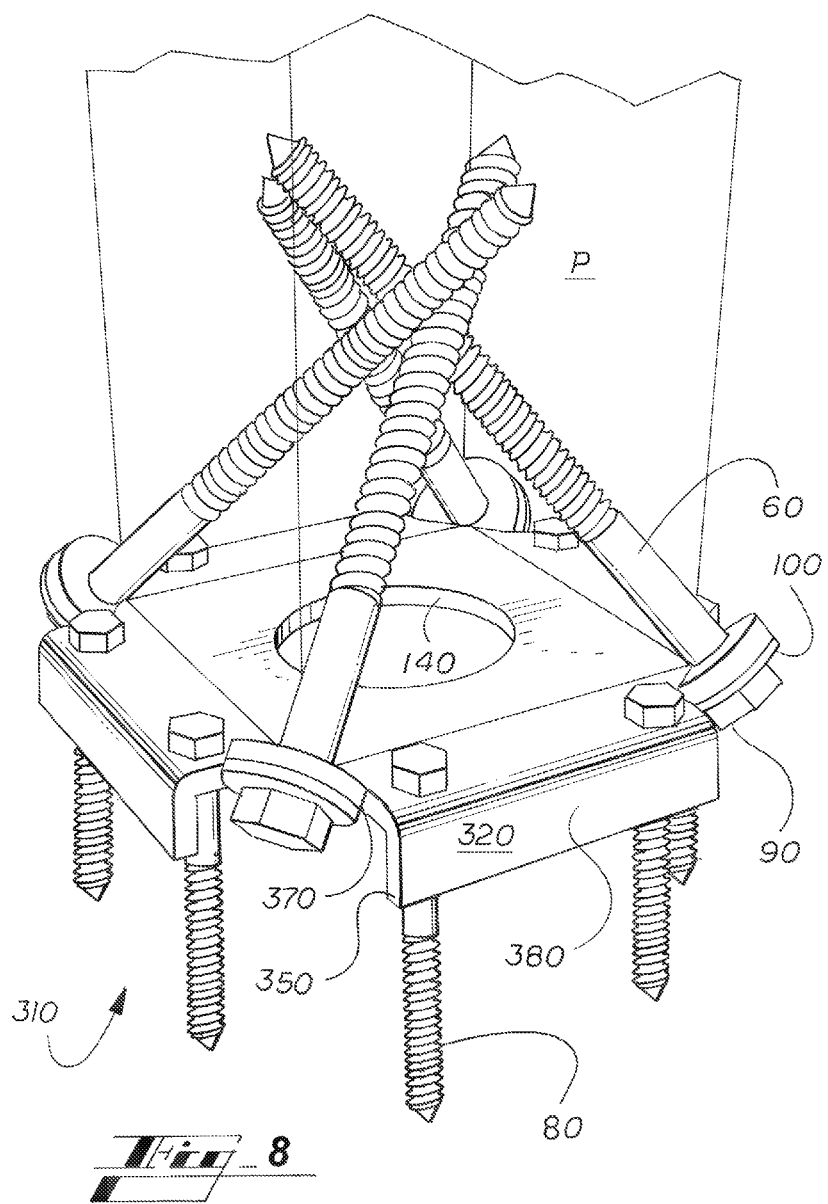
FIG. 8 depicts a side, perspective view of an alternative embodiment of a device for anchoring a post to a supporting surface constructed according to the present invention, looking from an outside vantage point and into an attached post, wherein can be seen the configuration of fasteners provided by this alternative embodiment of the device of the present invention, along with certain additional details of construction.

It is to be noted that the drawing Figures presented are intended solely for the purpose of illustration and that they are, therefore, neither desired nor intended to limit the claimed invention to any or all of the exact details of construction shown, except insofar as they may be deemed essential to the claimed invention.

DETAILED DESCRIPTION OF ILLUSTRATIVE EMBODIMENTS

In describing preferred embodiments of the invention of the present disclosure, as illustrated in the drawing Figures, specific terminology is employed for the sake of clarity. The claimed invention, however, is not intended to be limited to the specific terminology so selected, and it is to be understood that each specific element includes all technical equivalents that operate in a similar manner to accomplish a similar purpose.

The disclosure set forth herein particularly describes one or more exemplary, preferred, and alternative embodiments of a device of the present invention, along with associated methods of use, operation, and application thereof. Accordingly, and in those forms of the embodiments of the present invention chosen for purposes of illustration, FIGS. 1-13 depict a device for anchoring a post to a supporting surface, along with such associated and further structures, devices, and details as may be necessary for understanding the metes and bounds of the inventive subject matter.

Turning now to drawing FIGS. 1-6, wherein is depicted a preferred embodiment of a device according to the present invention, FIG. 1 depicts a side, perspective view of device 10 useful for anchoring post P to supporting surface S. Contextually, FIG. 1 further depicts an outside vantage point, looking into attached post P. FIG. 1 further depicts a plurality of various fasteners used in association with device 10, the arrangement, configuration, disposition, use, and operation of such fasteners further described hereinbelow.

Device 10 comprises base member 20 and post mounting surface 30. Post mounting surface 30 comprises post-facing seat 40. Base member 20 and post mounting surface 30 comprise a plurality of first openings 50, each such first opening 50 for accepting and accommodating fastener 60 for attaching device 10 to post P. As seen with regard to the embodiment of FIGS. 1-6, device 10 enables fasteners 60 to be introduced into post P at its corners, and slightly above its base, but then extending deeply into post P, in a unique construction that will be described in greater detail below. Base member 20 and post mounting surface 30 further comprise a plurality of second openings 70, perhaps best seen with reference to FIGS. 4 and 6, each such second opening 70 for accepting and accommodating fastener 80 for attaching device 10 to supporting surface S. Each first opening 50 is disposed to accept fastener 60 at an upwardly inclined angle and, further, at a laterally displaced offset angle, as will be described in greater detail hereinbelow.

Preferably, fastener 60 takes the form of a screw, such as hex head cap screw 90 depicted in the Figures, and may be coated to protect against weathering and corrosion such as by hot dip galvanization, plating, or other known processes. In some embodiments, fastener 60 comprises a ⅜"×6" hot dip galvanized hex head cap screw, sometimes also called a lag bolt. Fastener 60 preferably carries washer 100. Washer 100 may be integrally formed with fastener 60, or may comprise a separate washer. In some embodiments, washer 100 comprises a ⅜" flat washer. It will be apparent to one of ordinary skill in the art that differing numbers and types of washers may be used to carry and distribute fastener forces, and to provide an appropriate fastener seat. Furthermore, where appropriate to selected post and device materials, washer elements such as split washers, lock washers, and the like, without limitation, may be used to maintain a specified torque load over time.

Preferably, fastener 80 also takes the form of a screw, such as hex head cap screw 110 depicted in the Figures, and may be coated to protect against weathering and corrosion such as by hot dip galvanization, plating, or other known processes. In some embodiments, fastener 80 comprises a ¼"×3" hot dip galvanized hex head cap screw, sometimes also called a lag bolt. In some embodiments, fastener 80 comprises a 3" #12 pan head wood screw, appropriately finished against weathering and corrosion. It will be further apparent to one of ordinary skill in the art that fastener 80 may carry one or more washer, in order to meet those same considerations as were set forth above in the discussion of fastener 60 and washer 100.

Turning attention to the specific form and construction of device 10 according to FIGS. 1-6, base member 20 and post mounting surface 30 comprise, in this embodiment, separate and separable elements. Base member 20 may further comprise opening or relief 120. Opening or relief 120 may take any shape; however, as may be seen best with reference to FIG. 6, a contoured shape is preferred. Opening or relief 120 may be suitable for constructs of base member 20 wherein it is desirable to reduce weight, to provide a through-opening for equalization of post P and/or device 10 to an ambient environment, or the like. Base member 20, further details of construction of which will be set forth subsequently in greater detail, may be constructed according to processes such as machining, casting, molding, stamping, and the like, and combinations thereof. Depending upon application, use, required factors of safety, and other like considerations, base member 20 may be formed of metal, such as steel, aluminum, or the like, or may be formed of wood, fiber, synthetic, plastic, vinyl, rubber, ceramic, composite, and combinations thereof, and other appropriate materials, without limitation. Such materials may be finished by any process appropriate to the selected material, such as, for example, galvanization, plating, anodization, dip coatings, spray coatings, brush-on coatings, or the like.

In the form of the preferred embodiment depicted in FIGS. 1-6, post mounting surface 30 comprises the top surface of mounting plate 130. Mounting plate 130 may further comprise central opening 140. Central opening 140 may take any shape; however, as depicted in FIG. 1, a circular shape is sometimes preferred for ease of manufacture. In other embodiments, such as depicted in FIG. 1A, central opening 140 may take a more rectangular form. Central opening 140 may be suitable for constructs of mounting plate 130 wherein it is desirable to reduce weight, to provide a through-opening for equalization of post P and/or device 10 to an ambient environment, for drainage of water, or the like. Additionally, as may be seen with continuing reference to FIG. 1A, central opening 140 may be suitable for constructs of mounting plate 130 wherein it is further desirable to more closely align, and stabilize, mounting plate 130 in association with base member 20. This may be done, for example, by providing peripheral lip 144 disposed adjacent central opening 142 in base member 20, wherein central opening 140 cooperatively engages peripheral lip 144 to more closely align, and stabilize, mounting plate 130 in association with base member 20.

Mounting plate 130, further details of construction of which will be set forth subsequently in greater detail, may be constructed according to processes such as machining, casting, stamping, die cutting, and the like, and combinations thereof. Depending upon application, use, required factors of safety, and other like considerations, mounting plate 130 preferably is formed of metal, such as steel, stainless steel, aluminum, brass, bronze, nickel alloys, or the like, although other appropriate materials may be used. Such materials may be finished by any process appropriate to the selected material, such as, for example, galvanization, plating, anodization, dip coatings, spray coatings, brush-on coatings, or the like, without limitation. In the form of the preferred embodiment depicted in FIGS. 1-6, mounting plate 130 comprises steel, finished with hot dipped galvanization.

Notwithstanding the specific form and construction just described with regard to device 10 of FIGS. 1-6, as will be seen with regard to illustrative alternative embodiments, unitary forms of the device of the present invention may be constructed. Accordingly, all such forms, constructions, and manufactures are intended to fall within the inventive subject matter disclosed herein.

FIG. 2 depicts a side, perspective view of mounting plate 130 according to the preferred embodiment of the present invention shown in FIG. 1. In this figure may be seen upwardly inclined angle $\alpha$ associated with representative post fastener 60. Angle $\alpha$ is seen to be measured from post-facing seat 40 of mounting plate 130, upwardly to centerline axis A of fastener 60.

FIG. 3 depicts a top, perspective view of mounting plate 130 according to the preferred embodiment of the present invention shown in FIG. 1. In this figure may be seen laterally displaced offset angle $\beta$ associated with representative post fastener 60. Angle $\beta$ is seen to be measured from diagonal D that bisects the region comprising post-facing seat 40, and in this embodiment, is seen to be offset in a clockwise direction. It will be apparent to one of ordinary skill in the art that, in some embodiments, angle $\beta$ may be offset in a counterclockwise direction.

It will be observed that a vertical plane, passing through mounting plate 130 at line L offset from diagonal D and defining angle $\beta$, would pass through axis A of fastener 60. As best seen in FIG. 2, angle $\alpha$ would be defined between line L and axis A of fastener 60.

In use, fastener 60 is inserted from below mounting plate 130, through opening 50, upwardly at angle $\alpha$, and further offset to angle $\beta$, and is fastened into post P. In order to for mounting plate 130 to accommodate fastener 60 at angles $\alpha$, $\beta$, opening 50 is preferably provided as an elongate opening, such as a slot. In some embodiments, angle $\alpha$ may be approximately 40-50 degrees, with 45 degrees being preferred. In some embodiments, angle $\beta$ may be approximately 6-12 degrees, with 9 degrees being preferred.

Although preferred values for angles $\alpha$, $\beta$ have been described herein, it should be understood by one of ordinary skill in the art that each such angle may have one or more appropriate ranges and tolerances in a device manufactured according to the present invention. It is believed that specific choices for angles $\alpha$, $\beta$ are of less practical importance than to hold relative uniformity and/or consistency within the manufactured device with regard to angles $\alpha$, $\beta$ for each installed fastener 60 used in association therewith.

Accordingly, the position, orientation, and dimensions of opening 50, in association with base member 20, are established in device 10 in order to provide the desired angular orientations set forth above for fastener 60 when installed into post P. That is, when opening 50 takes the form of a slot, the major axis thereof is positioned in line with diagonal D. Opening 50 is sized, both in width and length dimensions, to accommodate, in association with base member 20, a diameter of fastener 60 when fastener 60 is oriented within device 10 according to angles $\alpha$, $\beta$.

FIG. 4 depicts a top, perspective view of device 10 according to the preferred embodiment of the present invention shown in FIG. 1. In this figure, a vantage point is provided to look from outside attached post P, downwardly and into post P. In this figure, the as-installed configuration of fasteners 60 provided by device 10 may be seen, as well as the effect of angles $\alpha$, $\beta$ on the position and orientation of fasteners 60 installed within post P. Each fastener 60 used in association with device 10 may be envisioned to fill a maximum dimensional envelope E. As can perhaps best be seen in this figure, angle $\beta$ assures that fasteners 60 will not intersect with one another; thereby, minimizing or avoiding the potential for interference during, and subsequent to, installation of fasteners 60. Angle $\beta$ also allows for use of fasteners 60 that are significantly longer than would be possible without such an offset angle; thereby, allowing for increased joint and connection strength than would otherwise be possible.

FIG. 5 depicts a side, perspective view of device 10 according to the preferred embodiment of the present invention shown in FIG. 1. In this figure, an outside vantage point is again provided to look into attached post P from a side. In this figure, as in FIG. 4, the as-installed configuration of fasteners 60 provided by device 10 may be seen, as well as the effect of angles $\alpha$, $\beta$ on the position and orientation of fasteners 60 installed within post P. As described during consideration of FIG. 4, angle $\beta$ assures that fasteners 60 will not intersect with one another; thereby, minimizing or avoiding the potential for interference during, and subsequent to, installation of fasteners 60. Angle $\beta$ also allows for use of fasteners 60 that are significantly longer than would be possible without such an offset angle; thereby, allowing for increased joint and connection strength than would otherwise be possible.

It should now be appreciated that device 10 orients and positions a plurality of fasteners 60 within post P in a configuration wherein fasteners 60 are disposed angularly about, and offset from, a central, vertical axis V, for example, that of post P, in a preferably non-intersecting arrangement. Further advantages provided by such configuration are discussed below.

FIG. 6 depicts a side, perspective view of device 10 according to the preferred embodiment of the present invention shown in FIG. 1. In this figure, an outside vantage point is again provided to look from an outside, upwardly inclined position, and into attached post P. In this figure can be seen certain additional details of construction of base member 20. Specifically, opening or relief 120 can be better appreciated. In some embodiments, opening or relief 120 may be contoured to provide for reduced overall part weight, but with increased strength in areas necessary to accommodate fasteners 80.

As can also be seen in this figure, base member 20 may comprise relief 150 to better accommodate a volume consumed by a head of fastener 60 and by any associated washer 100. Relief 150 might be considered to act analogously to a countersunk hole, wherein it advantageously provides fastener head clearance below a surface, in this case, supporting surface abutting face 160, and appropriate angular clearance to accommodate fastener 60 at angles α, β.

Base member 20 may further comprise fastener element bearing surface 170, in order to provide a flat surface to better accommodate a head of fastener 60 and any associated washer 100. Within relief 150, and passing through base member 20 and fastener element bearing surface 170, is opening 50. It will be observed that opening 50 is oriented so that fastener 60 will be axially oriented at preferred angles α, β when inserted into said opening 50.

It also will be observed that opening 50 and fastener element bearing surface 170 are approximately mutually perpendicular. In this configuration, fastener element bearing surface 170 may, importantly, provide a facing surface that is properly oriented so that a head of fastener 60 and any associated washer 100 will be oriented as required to ensure that fastener 60 is, in turn, axially oriented at preferred angles α, β when inserted into opening 50.

Alternative embodiments of the present invention will next be described. Such alternative embodiments advantageously accommodate varying or alternative methods of manufacture, while not departing from the many benefits and advantages provided by the preferred embodiment previously discussed. Except insofar as there are significant differences between an alternative embodiment and the preferred embodiment, features otherwise in common will not, as a rule, be described.

Turning now to FIG. 7, depicted is a side, perspective view of an alternative embodiment of a device for anchoring a post to a supporting surface constructed according to the present invention. Device 210 demonstrates a form of construction and manufacture wherein the need for base member 20 and post mounting surface 30 that were seen in the preferred embodiment of FIGS. 1-6 is obviated in favor of unitary construction taking the form of body 220. Other details and considerations regarding the invention, materials, processes, construction, and the like, are substantially similar to those that were set forth with regard to the preferred embodiment.

FIG. 8 depicts a side, perspective view of an alternative embodiment of a device according to the present invention. Device 310 demonstrates a unitary form of construction and manufacture that obviates any need to use a separate base member and post mounting surface, such as were seen in the preferred embodiment of FIGS. 1-6. Accordingly, FIG. 8 depicts a unitary construction of device 310 taking the form of body 320. Device 310 may comprise relief 350 to better accommodate a volume consumed by a head of fastener 60 and by any associated washer 100. Relief 350 provides appropriate angular clearance to accommodate fastener 60 at angles α, β.

Device 310 may further comprise fastener element bearing surface 370, in order to provide a flat surface to better accommodate a head of fastener 60 and any associated washer 100. Within relief 350, and passing through fastener element bearing surface 370, is opening 50. As with the preferred embodiment of FIGS. 1-6, it will be observed that opening 50 is oriented so that fastener 60 will be axially oriented at preferred angles α, β when inserted into said opening 50.

It will be observed that, in the form shown in FIG. 8, device 310 does not require use of a base member, such as base member 20 of the preferred embodiment; however, in appropriate circumstances and construction requirements, an alternative form of base member (not shown) may be used within the internal recess defined by flanges 380. Such alternative form of base member might be used to provide an additional support and/or stabilizing surface for body 320. In some embodiments, an alternative form of base member (not shown) could be constructed wherein slots are formed therewithin to receive flanges 380 of device 310. Such alternative form of base member might be used to provide an additional support and/or stabilizing surface for body 320, and to provide further resistance against overturning or twisting moments imparted by post P.

Figure 9:
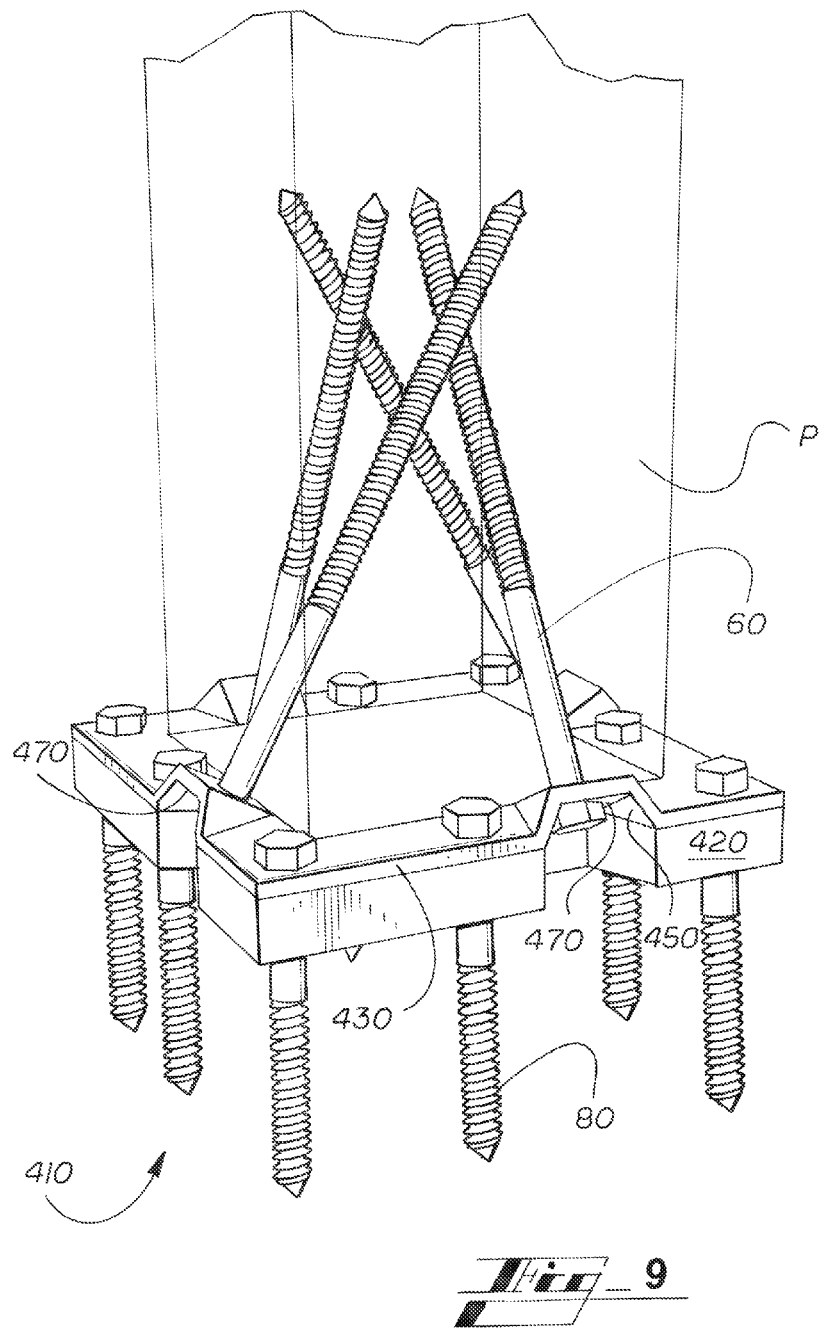
FIG. 9 depicts a side, perspective view of an alternative embodiment of a device for anchoring a post to a supporting surface constructed according to the present invention, looking from an outside vantage point and into an attached post, wherein can be seen the configuration of fasteners provided by this alternative embodiment of the device of the present invention, along with certain additional details of construction.

FIG. 9 depicts a side, perspective view of an alternative embodiment of a device constructed according to the present invention. Device 410 provides base member 420, contoured to meet post mounting surface 430. Specifically, device 410 may comprise relief 450 to better accommodate a volume consumed by a head of fastener 60 and by any associated washer 100. Relief 450 provides appropriate angular clearance to accommodate fastener 60 at angles α, β.

Device 410 may further comprise fastener element bearing surface 470, in order to provide a flat surface to better accommodate a head of fastener 60 and any associated washer 100. Within relief 450, and passing through fastener element bearing surface 470, is opening 50. As with the preferred embodiment of FIGS. 1-6, it will be observed that opening 50 is oriented so that fastener 60 will be axially oriented at preferred angles α, β when inserted into said opening 50.

With use of this alternative embodiment, it will be observed fasteners 60 may be introduced into post P from the post sides, rather than from a corner. In some embodiments, additional numbers of fasteners 80 may be accommodated, wherein such configuration would be advantageous for affixation of device 410 to supporting surface S. Further advantageously, the construction of device 410 does not mitigate the many advantages of the present invention described with regard to previous embodiments. Each first opening 50 remains disposed to accept fastener 60 at an upwardly inclined angle and, further, at a laterally displaced offset angle, as has been described in greater detail hereinabove, with the associated features, benefits, and advantages provided by such configuration.

Figure 10:
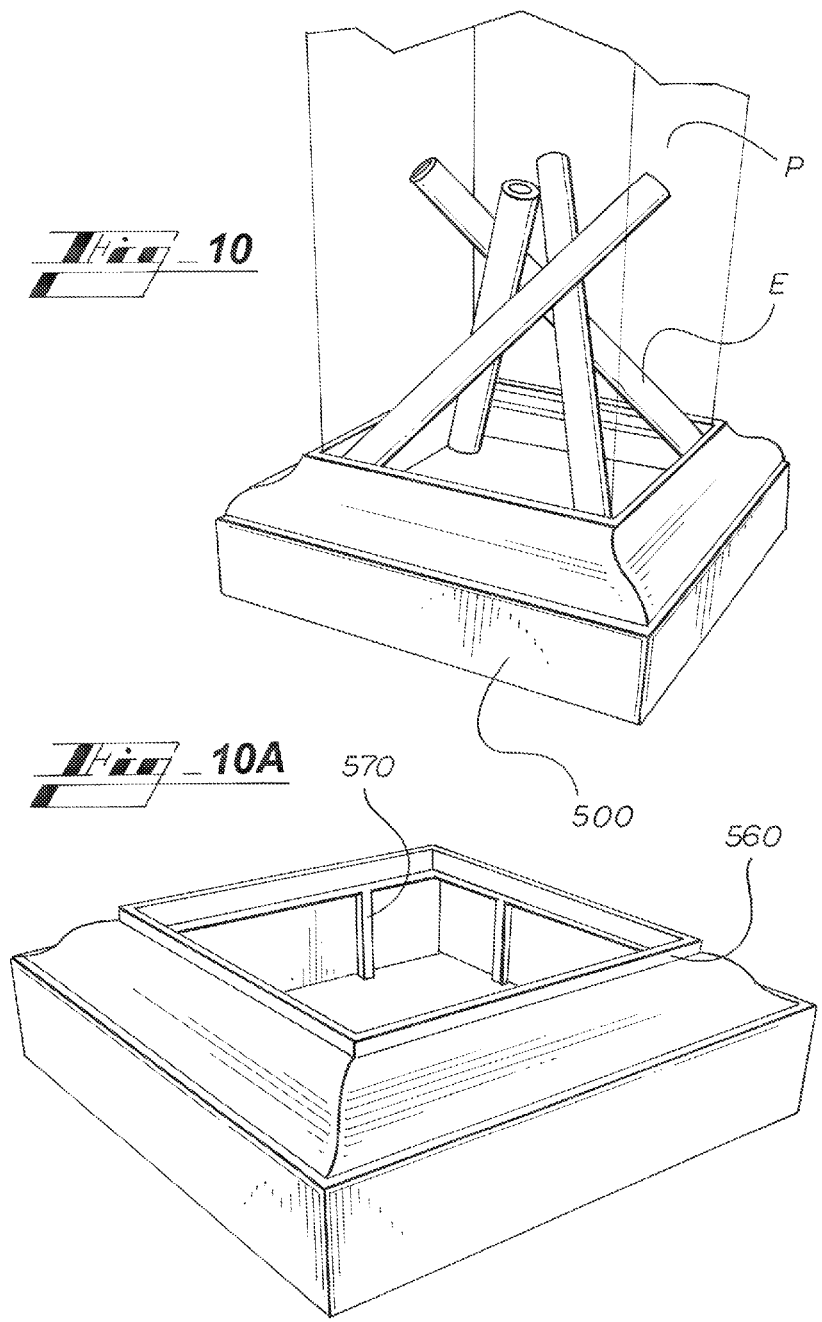
FIG. 10 depicts a side, perspective view of a cover for use with a device for anchoring a post to a supporting surface constructed according to the present invention, looking from an outside vantage point and into an attached post, wherein can be seen the configuration of fasteners provided by the device of the present invention, along with certain additional details of construction.

In some embodiments, a device according to the present invention may include an aesthetically pleasing cover 500. FIG. 10 depicts a side, perspective view of one embodiment of cover 500 for use with a device for anchoring a post to a supporting surface constructed according to the present invention. In such embodiments, cover 500 may be placed in position over the device of the present invention, the associated supporting surface S, and the post-end, in order to hide the device, the mounting fasteners, and the post-end from view, and, when applicable, to provide a pleasantly contoured surface for application of stain, paint, varnish, lacquer, and/or other appropriate finish. In some embodiments, any gap between cover 500 and post P may be filled with a water resistant or water proof material, such as caulk, putty, gasket material, or the like, as is known in the art.

FIG. 10A depicts a side, perspective view of an alternative embodiment of cover 500 for use with a device for anchoring a post to a supporting surface constructed according to the present invention. In such embodiments, cover 550 may be provided with extended rim 560 and/or ribs 570. Although, in some embodiments, extended rim 560 may be purely decorative, in other embodiments, extended rim 560 may bear against post P to better orient and more closely align cover 550 with post P. Similarly, ribs 570 may bear against post P to better orient and more closely align cover 550 with post P. In some embodiments, any gap between extended rim 560 and post P may be filled with a water resistant or water proof material, such as caulk, putty, gasket material, or the like, as is known in the art. As described above with regard to cover 500, cover 550 may be placed in position over the device of the present invention, the associated supporting surface S, and the post-end, in order to hide the device, the mounting fasteners, and the post-end from view, and, when applicable, to provide a pleasantly contoured surface for application of stain, paint, varnish, lacquer, and/or other appropriate finish.

Figure 11:
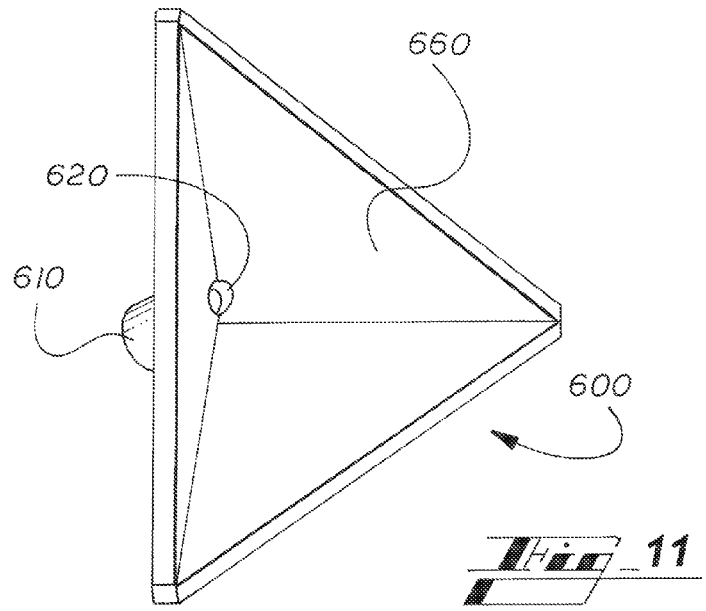
FIG. 11 depicts an inside, perspective view of one form of guide that may be used in association with a device for anchoring a post to a supporting surface constructed according to the present invention, the guide for purposes of opening, such as by drilling, a pilot hole within a post for subsequent use and association with a fastener carried by a first opening of a device according to the present invention.
Figure 12:
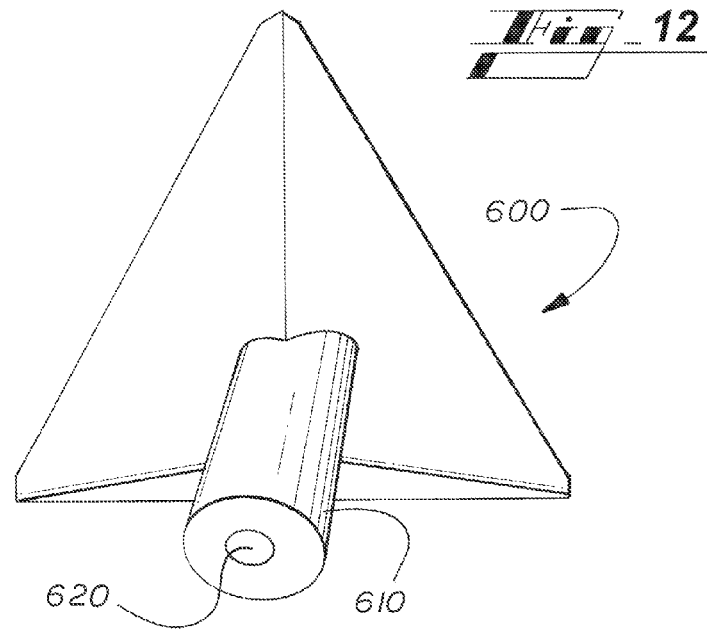
FIG. 12 depicts an outside, perspective view of one form of guide according to FIG. 11 that may be used in association with a device for anchoring a post to a supporting surface constructed according to the present invention, the guide for purposes of opening, such as by drilling, a pilot hole within a post for subsequent use and association with a fastener carried by a first opening of a device according to the present invention.

Turning now to FIGS. 11-13, FIG. 11 depicts an inside, perspective view of one form of guide 600 that may be used to open, such as by drilling, a pilot hole within post P for subsequent use and association with fastener 60 carried by a first opening 50 of a device according to the present invention. FIG. 12 depicts an outside, perspective view of that form of guide depicted in FIG. 11. Through use of guide 600, an appropriate pilot opening may be formed within post P, at angles α and β, in order to more easily accept fastener 60 in a preferred orientation.

Guide 600 may be configured, for example, to locate and fit against a corner of post P, adjacent an end of post P. As shown in FIG. 11, guide 600 may, in some embodiments, be constructed of triangularly-shaped side walls 660, joined to accept a corner of post P at its end. Guide 600 may carry one or more guide feature 610 to accept and guide a pilot hole forming tool, such as a drill bit. As best seen with reference to FIG. 12, guide feature 610 may comprise, for example, a cylindrical boss through which has been provided an appropriate opening 620, oriented to guide a pilot hole forming tool at angles α and β, in order to more easily accept fastener 60 in a preferred orientation. In some embodiments, opening 620 may be approximately ¼" diameter.

An alternative embodiment of a guide as described above with reference to FIGS. 11-12 may be seen with reference to FIG. 13. As with guide 600, guide 650 may, in some embodiments, be constructed of two triangularly-shaped side walls 660 and one "L-shaped" or "V-shaped" side wall 670, joined to accept a corner of post P at its end. Guide 650 may carry one or more guide feature 610 to accept and guide a pilot hole forming tool, such as a drill bit. Guide feature 610 may comprise, for example, a cylindrical boss through which has been provided an appropriate opening 620, oriented to guide a pilot hole forming tool at angles α and β, in order to more easily accept fastener 60 in a preferred orientation. In some embodiments, opening 620 may be approximately ¼" diameter.

Notwithstanding the construction of guides 600, 650 depicted in FIGS. 11-13, it will be apparent that guides 600, 650 may be of unitary or alternative construction without departing from the essential purposes disclosed herein.

In an exemplary method for use and application of the present invention, a guide is used to open a plurality of pilot holes within a post, each pilot hole corresponding to, and for subsequent use and association with, a fastener carried by a first opening of a device according to the present invention. A post-facing seat of the device is positioned adjacent the end of the post. A fastener, such as a hex head cap screw, preferably carrying an integrally formed or separate washer, is inserted through each first opening of the device, into the associated pilot hole, and is subsequently screwed into the post and tightened to a preferred torque specification. The post, now carrying the entirety of the device, or in some embodiments, a portion thereof, is inverted, assembled, if necessary, with other elements of the device, and positioned upon a supporting surface. A fastener, such as a hex head cap screw, preferably carrying an integrally formed or separate washer, is inserted through each second opening of the device, and is subsequently screwed into the supporting surface and tightened to a preferred torque specification. In some embodiments, an aesthetically pleasing cover may be placed in position over the device of the present invention, the associated supporting surface, and the post-end, in order to hide the device, the mounting fasteners, and the post-end from view, and, when applicable, to provide a pleasantly contoured surface for application of stain, paint, varnish, lacquer, and/or other appropriate finish.

It will be understood and appreciated by one of ordinary skill in the art that the present invention is useful for anchoring posts made, for example, from materials such as wood, fiber, synthetic, plastic, vinyl, composite, metal, and combinations thereof, and other materials without limitation, to supporting surfaces made, for example, from materials such as wood, fiber, synthetic, plastic, vinyl, composite, metal, concrete, and combinations thereof, and other materials without limitation. Any modifications required to adapt the present invention to use in association with any such post and/or supporting surface materials would be well-known to, and appreciated by, one of ordinary skill in the art without resorting to undue experimentation.

With this configuration, a device according to the present invention uniquely orients and positions a plurality of fasteners within the post for a significantly stiffer, stronger, and more stable connection than is known within the current state of the art. More particularly, the device orients and positions a plurality of fasteners within the post in a configuration wherein the fasteners are disposed angularly about, and offset from, a central, vertical axis in a preferably non-intersecting arrangement.

With benefit of the detailed disclosure set forth herein, as directed to the several embodiments presented, it should now be apparent that there are important advantages afforded by the present invention over the prior art. Specifically, the present invention, in any of the several embodiments, provides a significantly stiffer, stronger, and more stable connection between post P and supporting surface S than is known to be possible within other devices meeting the current state of the art. These advantages are believed to be rendered by the ability of the present invention to better resist both twisting and overturning moments in an attached post P. Such advantages are believed to be facilitated through use of angles α, β in orienting fasteners 60 within post P. Further, with the present invention, a longer resistive arm can be provided against adverse forces by allowing fasteners 60 to be held and constrained rigidly by the present invention from a position outside the dimensional and physical envelope of post P. Still further, through the use of angles α, β angles α, β, relatively longer fasteners 60 can be accommodated by the present invention for additional strength. As can be seen in the several figures, through use of the present invention, fasteners 60 may advantageously reach into the core of attached post P for maximized holding and gripping strength. It will also be observed that, through use of angles α, β, fasteners 60 are favorably oriented to cut across the grain structure of materials, such as wood, where splitting or crack failures are a prominent mode of failure. Through use of the present invention, it is believed that increased factors of safety may now be provided in deck, fence, balcony, railing, and related applications.

Having, thusly, described exemplary embodiments and methods of use of the present invention, it should be noted by those skilled in the art that the within disclosures are exemplary only and that various other alternatives, adaptations, and modifications may be made within the scope and spirit of the present invention. In this regard, it is contemplated that the general teachings hereof could and may be adapted to other, further, and future configurations and implementations conducive to construction and/or use of the present invention. Accordingly, the present invention is not limited to the specific embodiments as illustrated herein, but is only limited by the following claims.

What is claimed:

1. A device for anchoring a post to a supporting surface, the device comprising:
   a mounting surface for mounting an end of said post;
   a plurality of spaced-apart first openings adjacent said mounting surface, each said first opening configured to receive a corresponding fastener acting to attach the device to the post;
   a plurality of spaced-apart second openings positioned between said first openings, each said second opening configured to receive a corresponding fastener acting to attach the device to a supporting surface;
   said second openings offset from said first openings so as to dispose the central axes of each said first and each said second opening in non-coincidental relationship;
   each said first opening configured to receive the corresponding fastener with a head of the fastener proximate said first opening and outside the periphery of the post, a body of the fastener projecting from said first opening at an upwardly inclined vertical angle with respect to said first opening and into the post at a laterally displaced offset angle with respect to the horizontal, each said second opening configured to receive the corresponding fastener, said corresponding fastener extending downwardly into the supporting surface;
   the device configured to orient and position within the post the terminal ends of the respective bodies of the plurality of fasteners received by said first openings in a resulting configuration wherein the respective fastener bodies are disposed angularly about, and offset from, a central, vertical axis defined by the post, in a substantially non-intersecting arrangement.

2. The device of claim 1, wherein said upwardly inclined angle is approximately 45 degrees.

3. The device of claim 1, wherein said laterally displaced offset angle is approximately 9 degrees.

4. The device of claim 1 comprising a unitary construction.

5. The device of claim 1 further comprising a base member and a post mounting surface.

6. The device of claim 5 wherein said base member further comprises an opening, said opening contoured to provide for reduced overall part weight, but with increased strength in areas necessary to accommodate a fastener.

7. The device of claim 5 wherein said base member further comprises a relief, said relief contoured to provide for reduced overall part weight, but with increased strength in areas necessary to accommodate a fastener.

8. The device of claim 5 wherein said base member further comprises a central opening and a peripheral lip, said peripheral lip disposed to cooperatively engage a central opening within said post mounting surface.

9. The device of claim 1 further comprising a post-facing seat.

10. The device of claim 1 further comprising a central opening.

11. The device of claim 1 further comprising a fastener element bearing surface associated with each said first opening, wherein said fastener element bearing surface provides a facing surface oriented so that the head of the corresponding fastener is disposed in position to ensure that the fastener body is axially extended at said upwardly inclined vertical angle with respect to said first opening and into the post at a laterally displaced offset angle with respect to the horizontal when the fastener is inserted into said first opening.

12. The device of claim 1 further comprising a relief associated with each said first opening, said relief configured to accept a volume consumed by the head of the fastener.

13. The device of claim 1 further comprising a cover.

14. The device of claim 13 wherein said cover further comprises internal ribs for bearing against a post.

15. The device of claim 1 further comprising a central opening.

16. The device of claim 14 further comprising at least one downwardly depending peripheral flange.

17. The device of claim 14 further comprising a cover.

18. The device of claim 17 wherein said cover further comprises internal ribs for bearing against a post.

19. A method for anchoring a post to a supporting surface, the method comprising the steps of:
   (a.) positioning a device carrying a post-facing seat adjacent the end of a post;
   (b.) affixing a plurality of first fasteners into the post, each said first fastener passing through a corresponding first opening positioned adjacent the post facing seat and, each said first opening configured to receive said first fastener with a head of said first fastener proximate said first opening and outside the periphery of the post, a body of said first fastener projecting from said first opening and into the post at a laterally displaced offset angle with respect to the horizontal, the body of each said first fastener disposed at an upwardly inclined vertical angle with respect to said first opening, in a resulting configuration wherein the respective fastener bodies are at a laterally displaced offset angle with respect to a central, vertical axis defined by the post, and in a substantially non-intersecting arrangement; and
   (c.) affixing said post to the supporting surface with a plurality of second fasteners, each said second fastener passing downwardly through a corresponding second opening associated with said device, each said second opening offset from each said first opening so as to dispose the central axes of each said first opening and each said second opening in non-coincidental relationship.

20. The method of claim 19 further comprising the step of placing a cover over the post end in order to hide the device, the mounting fasteners, and the post-end from view, and, when applicable, to provide a pleasantly contoured surface for application of stain, paint, varnish, lacquer, and/or other appropriate finish.

21. The method of claim 19 wherein step (b.) further comprises a precedent step of using a guide to form a plurality of pilot holes within said post, said pilot holes disposed at said upwardly inclined angle and, further, at said laterally displaced offset angle with respect to said central, vertical axis and in a substantially non-intersecting arrangement.

* * * * *